UNITED STATES PATENT OFFICE.

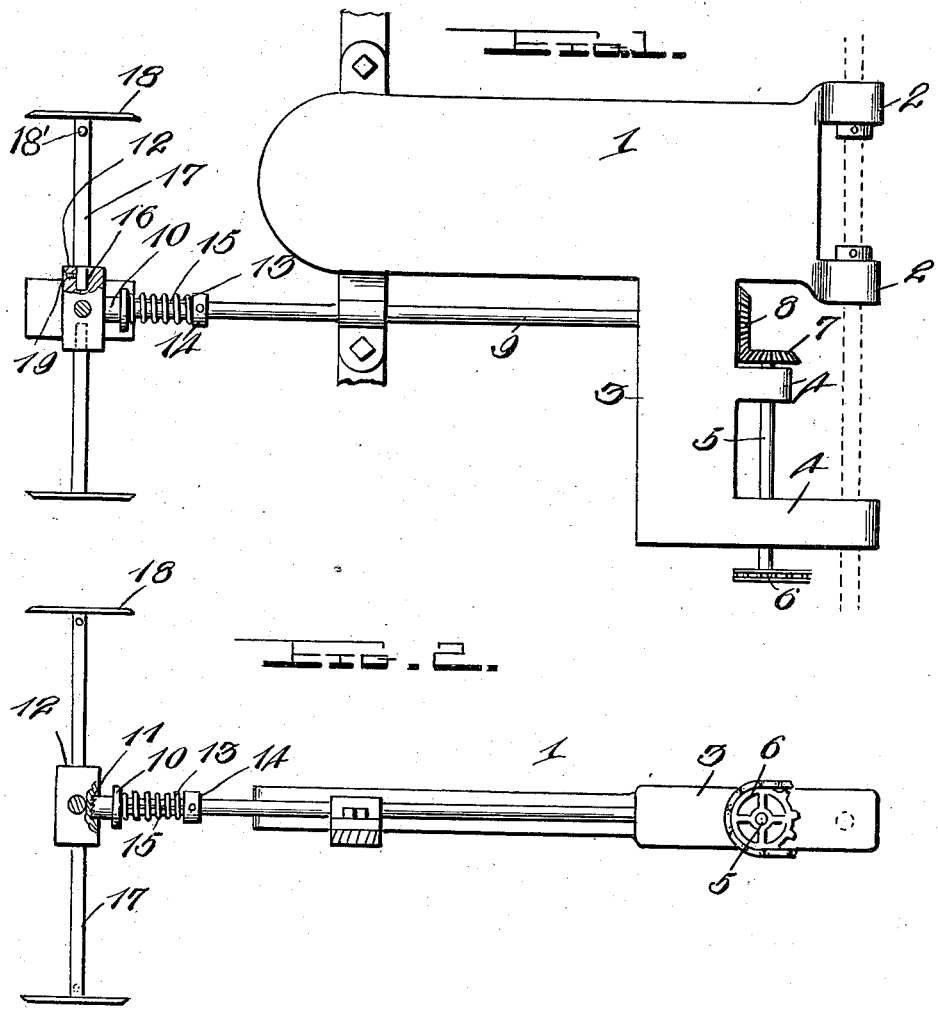

LEWIS ISAAC RICHARDS, OF CRESCENT, OKLAHOMA.

COTTON-CHOPPER.

1,028,278.  Specification of Letters Patent.  Patented June 4, 1912.

Application filed August 28, 1911. Serial No. 646,316.

*To all whom it may concern:*

Be it known that I, LEWIS I. RICHARDS, a citizen of the United States, residing at Crescent, in the county of Logan and State of Oklahoma, have invented certain new and useful Improvements in Cotton-Choppers, of which the following is a specification, reference being had to the accompanying drawings.

This invention relates to chopping and blocking machines and more particularly to that class which are used for thinning out growing cotton plants.

The main object of this invention is to provide an attachment which can be applied to cultivators or the like, for the purpose of thinning out plants and removing weeds that may be growing around the plants that are left standing.

Another object of this invention is to arrange it so that it can be easily controlled.

A further object of this invention is to provide means whereby the plants will be chopped or blocked the right distance apart, this means being arranged so as to permit the knives or choppers to be spaced as desired.

A still further object is to have the construction of this device such that it can be cheaply manufactured and readily inspected.

Other objects of this invention will become apparent as it is more fully set forth.

In the accompanying drawings which illustrate by way of example an embodiment of this invention, Figure 1 represents a plan view of a device embodying this invention. Fig. 2 is a side elevation of Fig. 1.

Similar reference characters refer to similar parts throughout the drawings.

My improved attachment includes a plate 1 which is arranged at its rear end for support on one of the frame bars of a cultivator and which is formed at its forward end with laterally spaced ears 2 by which it may be mounted upon the main axle of the implement. The plate 1 is formed intermediate of its ends with a lateral extension 3, said extension being formed with bearings 4 in which a transverse shaft 5 is mounted. The shaft 5 is provided at its outer end with a sprocket wheel 6 over which a chain is passed in order to drive said shaft, and the inner end of the shaft is provided with a bevel pinion 7. The sprocket is arranged to transmit power from the hub of the cultivator by means of another gear mounted thereon and a transmission chain, in the usual manner. A bevel gear 8 meshes with the bevel gear 7 and transmits the power therefrom to a shaft 9 on which it is mounted and which is secured in a casting in the manner clearly shown in the drawings. The end portion of the shaft 9 is provided with a sleeve 10 on which is mounted a suitable catch 11, that is arranged to actuate a hub member 12, which is loosely mounted on the end portion of the shaft 9. This sleeve is arranged to be kept normally in engagement with the hub member 12 by means of a coil spring 13 and collar 14 mounted on the shaft 9. The sleeve 10 is arranged to rotate with the shaft 9 and to readily slide in a manner similar to the ordinary clutch mechanism, a suitable key 15 being provided to assist in this action. The hub member 12 is provided with a number of holes 16 which extend radially into the hub, and which are arranged to receive spoke members 17 that are provided on their outer ends with a suitable chopping knife 18 for the purpose for which the device is to be used. These spokes are held in any suitable manner to the hub member.

In the drawings, 19 represents a set screw or wedge bolt which is preferably used for fastening the spoke members in the hub. The depth of the holes 16 is such as to permit a certain amount of adjustment of the spokes within them so that the knives can be regulated radially as desired.

The general operation of the device is as follows: Power is transmitted to the sprocket 6 which actuates the shaft 5 and incidentally the bevel gear 7, from thence the power is transmitted to the bevel gear 8 to the shaft 9 and thence to the sleeve 10. Should the sleeve have its catch portion 11 disposed within the hub member, it will actuate the same and cause the knives to revolve and chop into the plants which are within their reach. At the same time the knives will dig into the ground slightly and uproot any weeds that come within their reach. If the catch is not disposed within the hub member, it will turn freely with the shaft 9 and the hub member will not rotate but slip loosely on the shaft 9.

The hub being provided with a number of holes which are spaced comparatively close together, permit spokes in various numbers to be placed within them. The spokes can be so disposed in the holes as to give a various periodic cutting action to the choppers or knives, depending on the placing and the number of spokes within the holes in the hub.

Obviously while there is shown but one form of this invention in the drawings, it is not desired to limit this application for patent to this particular construction, or in any other way than necessitated by the prior art as many modifications in the construction of this invention may be made without departing from the principles thereof.

It will be understood from the drawings that the blades 18 are adjustably mounted in the end of the spokes, the fasteners 18' being provided for the purpose of holding them securely in any position they may be radially disposed in, at the end of the spokes.

What is claimed is:

An attachment for cultivators, consisting of a plate arranged for attachment to a frame bar of a cultivator and formed at one edge with ears by which it is adapted to be mounted on the main axle of the cultivator, the plate being formed intermediate of its ends with a lateral extension provided with bearings, a transverse shaft journaled in said bearings, a sprocket wheel secured to the outer end of said shaft, a bevel pinion secured to the inner end of said shaft, a bevel gear wheel meshing with said pinion, a longitudinally extending shaft extending through the lateral extension and journaled therein and carrying said gear wheel, and a revoluble chopper mounted on one end of said longitudinal shaft.

In testimony whereof I hereunto affix my signature in the presence of two witnesses.

LEWIS ISAAC RICHARDS.

Witnesses:
E. R. COOK,
S. D. STOBAUGH.

Copies of this patent may be obtained for five cents each, by addressing the "Commissioner of Patents, Washington, D. C."